United States Patent [19]

Koga et al.

[11] Patent Number: 4,655,838

[45] Date of Patent: Apr. 7, 1987

[54] CEMENT ADDITIVE COMPOSITION

[75] Inventors: Yasuharu Koga; Fumitada Yamamoto, both of Tokuyama; Hideharu Shimokawa, Funabashi, all of Japan

[73] Assignee: Idemitsu Petrochemical Co., Ltd., Tokyo, Japan

[21] Appl. No.: 769,566

[22] Filed: Aug. 26, 1985

[30] Foreign Application Priority Data

Sep. 27, 1984 [JP] Japan .................. 59-200592
Nov. 13, 1984 [JP] Japan .................. 59-237484

[51] Int. Cl.$^4$ .................................................. C04B 7/35
[52] U.S. Cl. ............................ 106/90; 106/314; 524/4; 524/5; 524/6
[58] Field of Search .............. 106/90, 314; 166/293; 524/4, 5, 6

[56] References Cited

U.S. PATENT DOCUMENTS

| | | | |
|---|---|---|---|
| 3,563,930 | 2/1971 | Stram | 106/90 |
| 3,952,805 | 4/1976 | Persinski et al. | 106/90 |
| 4,367,094 | 1/1983 | Fujimaru et al. | 106/90 |

*Primary Examiner*—William R. Dixon, Jr.
*Assistant Examiner*—Steven Capella
*Attorney, Agent, or Firm*—Frishauf, Holtz, Goodman & Woodward

[57] ABSTRACT

When a cement-based mixture such as cement paste, mortar and concrete is admixed with the inventive cement additive composition, the cement-based mixture is imparted with lastingly improved flowability and hence workability. The cement additive composition of the invention comprises (a) 100 parts by weight of a saponified product of (a half ester of) a copolymer of styrene and maleic acid and (b) from 5 to 900 parts by weight of a flowability improving agent such as a salt of a condensation product of naphthalene sulfonic acid with formaldehyde, salt of a condensation product of an alkylnaphthalene sulfonic acid with formaldehyde, salt of a condensation product of a sulfonated creosote oil with formaldehyde and the like.

18 Claims, No Drawings

CEMENT ADDITIVE COMPOSITION

BACKGROUND OF THE INVENTION

The present invention relates to a cement additive composition or, more particularly, to a cement additive composition capable of improving the dispersibility of the cement particles in a cement-based mixture, i.e. cement paste, mortar or concrete, admixed therewith and capable of improving the workability of a cement-based mixture by increasing the flowability or by preventing decrease in the flowability with a lapse of time.

As is known, cement-based mixtures such as cement paste, mortar and concrete must be formulated with water in an excessive volume over the minimum required for the hardening or setting reaction of the cement because a cement-based mixture prepared with water in just the minimum volume for the hardening reaction has a consistency not suitable for satisfactory working due to the strong cohesive force between the cement particles. The increase of the volume of water in a cement-based mixture, however, is necessarily accompanied by the decrease in the strength of the hardened body of the mixture which can be compensated only by increasing the amount of cement formulated in the mixture but an overly increase in the amount of cement in a unit volume of the cement-based mixture results in increase of the heat evolution by the hardening reaction leading to increased danger of crack formation in the hardened body.

Another serious problem with cement-based mixtures at a working site is the inconsistency of the workability of the cement-based mixtures from time to time. Cement-based mixtures are usually prepared by blending the base materials at a plant and transported to a working site by a concrete mixer car so that the variation in the time taken for the transportation due to the difference in the distance between the mixing plant and the working site or the degree of traffic jam directly influences the consistency and hence workability of the cement-based mixture.

A further difficulty is sometimes encountered in pressurized pumping of a cement-based mixture through a pipe. That is, when resumption of pumping of a cement-based mixture is desired after a certain length of time after an interruption, the mixture held in the pipe has acquired an increased consistency or decreased flowability so that the pumping pressure for resumption must be unduly increased or, in the worst case, the pipe is partly or completely clogged by the hardened mixture.

As is mentioned above, the most simple and convenient method for improving the flowability of a cement-based mixture is to increase the volume of water formulated therein with the resultant unavoidable disadvantages of increased danger of crack formation or failure of the hardened body of the mixture. Accordingly, it is eagerly desired to develop a cement additive resulting in water volume reduction, and capable of improving the dispersibility of the cement particles and also imparting to the cement-based mixture satisfactorily workable flowability along with an increase in the time period of the thus improved flowability.

Various kinds of cement additives having such an effect have been proposed and developed. Some of them include salt-type condensation products of sodium naphthalene sulfonate and formaldehyde and salt-type condensation products of alkylnaphthalene sulfonic acid and formaldehyde. These conventional cement additives are indeed effective in improving the flowability of a cement-based mixture to some extent although the effectiveness thereof is not quite satisfactory and the thus improved flowability of a cement-based mixture admixed therewith cannot be retained for a sufficiently long time as desired.

The inventors have accordingly undertaken extensive investigations to develop a cement additive capable of imparting a cement-based mixture with improved flowability which is maintained over a longer period of time and discovered and proposed previously that a combination of a saponified product of a sulfonated copolymer of styrene and maleic acid with one or more of certain other flowability-improving additives can satisfactorily serve for the above mentioned purpose (see Japanese Patent Kokai No. 6033242 and U.S. Ser. No. 629,316). This proposal, however, is not so effective as to completely solve the problem because the sulfonation of the above mentioned copolymer is performed in a complicated process with a limited yield of the sulfonation product of, usually, about 70% and the proposed cement additive has little contribution to the lasting improvement of the flowability of a cement-based mixture.

SUMMARY OF THE INVENTION

It is therefore an object of the present invention to provide a novel cement additive composition which is capable of lastingly improving the flowability of a cement-based mixture.

Another object of the invention is to provide a cement additive composition which can be prepared in a simple and economical process and still exhibits the above mentioned desirable performance as a cement additive to improve the flowability of a cement-based mixture.

Thus, the cement additive composition of the present invention for lastingly improving the flowability of a cement-based mixture comprises: (a) 100 parts by weight of a saponified product of a copolymer of styrene and maleic acid or a saponified product of a half ester of a copolymer of styrene and maleic acid; and (b) from 5 to 900 parts by weight of at least one flowability-improving agent selected from the group consisting of a salt of a condensation product of naphthalene sulfonic acid with formaldehyde, salt of a condensation product of alkyl-naphthalene sulfonic acid with formaldehyde, salt of a condensation product of naphthalene sulfonic acid and alkyl-naphthalene sulfonic acid with formaldehyde, salt of a condensation product of naphthalene sulfonic acid and lignin sulfonic acid with formaldehyde, salt of lignin sulfonic acid, sulfonation product of a condensation product of melamine with formaldehyde, saponified product of a sulfonated copolymer of styrene and maleic acid, salt of a condensation product of a sulfonated creosote oil with formaldehyde and salt of a condensation product of a sulfonated heavy aromatic hydrocarbon oil with formaldehyde.

DETAILED DESCRIPTION OF THE PREFERRED EMBODIMENTS

From the results obtained in the investigations on the performance of the previously proposed cement additive composition composed of a saponified product of a sulfonated copolymer of styrene and maleic acid and one or more of certain other flowability-improving additives, it was concluded that the effect on the improvement of the dispersibility of the cement particles is attributable to the sulfonic acid group while the carboxyl groups have an effect of extending the retention time of the improved flowability of the cement-based mixture. This conclusion was utilized to establish the present invention which provides a novel cement additive composition composed of a saponified product of an unsulfonated copolymer of styrene and maleic acid or a half ester thereof as the first component and a compound having sulfonic acid group as the second component to exhibit a synergistic effect in both respects of the improvement of the dispersibility of the cement particles and extension of the retention time of the thus improved flowability.

The component (a) in the inventive cement additive composition is the saponified product of a copolymer of styrene and maleic acid which is composed of the recurring units represented by the general formula

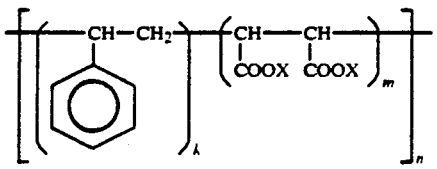

in which X is an atom of sodium, potassium or calcium or an ammonium group, k is an integer of 1 to 5, m is an integer of 1 to 3 and n is an integer of 4 to 10.

The component (a) is, alternately, the saponified product of a half ester of a copolymer of styrene and maleic acid which is composed of the recurring units represented by the general formula

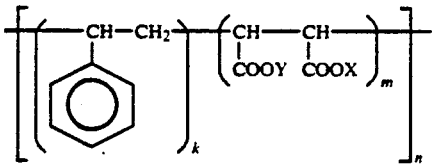

in which Y is R or ROR', R and R' each denoting an alkyl group or an cycloalkyl group, X is an atom of sodium, potassium or calcium or an ammonium group and k, m and n each have the same meaning as defined above.

The saponified product of a copolymer of styrene and maleic acid can be obtained by saponifying the copolymer of styrene and maleic acid by use of sodium hydroxide, potassium hydroxide, calcium hydroxide, ammonium hydroxide and the like. The copolymer of styrene and maleic acid may be either a random copolymer or a block copolymer and should preferably have a number-average molecular weight in the range from 1000 to 9000 or, more preferably, in the range from 1500 to 3000.

The saponified product of a half ester of a copolymer of styrene and maleic acid can be prepared by a half-esterification of the copolymer of styrene and maleic acid by use of an alcohol and the like, and then saponifying the resulting half-ester in the same manner as above.

The cement additive composition of the invention is a combination of the above described saponified product as the component (a) and a sulfonic acid group-containing compound described below as the component (b).

Exemplary of the sulfonic acid group-containing compound suitable as the component (b) are: a salt of a condensation product of naphthalene sulfonic acid with formaldehyde; a salt of a condensation product of an alkylnaphthalene sulfonic acid with formaldehyde; a salt of a condensation product of naphthalene sulfonic acid and an alkylnaphthalene sulfonic acid with formaldehyde; a salt of a condensation product of naphthalene sulfonic acid and lignin sulfonic acid with formaldehyde; a salt of lignin sulfonic acid; sulfonated product of a condensation product of melamine with formaldehyde; a saponified product of a sulfonate of copolymer of styrene and maleic acid; a salt of a condensation product of sulfonated creosote oil with formaldehyde; a salt of a condensation product of a sulfonated heavy aromatic hydrocarbon oil with formaldehyde and the like. These sulfonic acid group-containing compounds may be used either singly or as a combination of two kinds or more according to need. The above mentioned salt-type compounds are preferably salts of sodium, potassium, calcium or ammonium.

In the inventive cement additive composition, the above described component (b) is combined with the component (a) in an amount from 5 to 900 parts by weight or, preferably, from 25 to 400 parts by weight per 100 parts by weight of the component (a).

The inventive cement additive composition is effective in any type of cement-based mixtures including a cement paste, i.e. a mixture of cement and water, mortar, i.e. a mixture of cement, sand and water, and concrete, i.e. a mixture of cement, sand, gravel (or small stone) and water. The cement-based mixture may be admixed with a ready-mixed cement additive composition of the invention composed of the components (a) and (b) or, alternatively, with the respective components (a) and (b) separately according to the above mentioned weight proportion.

Though not particularly limitative, the cement additive composition of the invention should be added to a cement-based mixture in an amount in the range from 0.01 to 1.0% by weight or, preferably, from 0.05 to 0.5% by weight calculated as solid based on the content of cement in the cement-based mixture.

It is optional that cement-based mixtures may be admixed, in addition to the inventive cement additive composition, with various kinds of known cement additives such as water-reducing agents, retarders, curing accelerators, air entrainers, air-entraining water-reducing agents and the like according to need.

When a cement-based mixture is admixed with the inventive cement additive composition, the dispersibility of the cement particles in the mixture can be remarkably improved and the mixture is imparted with improved flowability suitable for working along with extention of the retention time of the thus improved flowability. Therefore, the working efficiency can be greatly increased in the construction works using the cement-based mixture. In addition, the inventive cement additive composition has a water-reducing effect so that hardened bodies of mortar and concrete admixed with the inventive cement additive composition have increased strengths without the danger of crack formation or other defects. Accordingly, the cement additive composition of the invention is very useful in civil engineering and building construction as well as in the fabrication of pre-shaped concrete products.

In the following, Examples are given to illustrate the cement additive composition of the present invention in more detail.

Preparation 1 (Preparation of a saponified copolymer of styrene and maleic acid)

An aqueous alkaline solution was prepared by introducing 1.77 kg of sodium hydroxide and 12 kg of water into a glass reaction vessel of 100 liter capacity with agitation. Then, 6.45 kg of a copolymer of styrene and maleic acid in a styrene/maleic anhydride copolymerization ratio of 1:1 by moles having a number-average molecular weight of 1600 and an acid value of 480 mg KOH/g (SMA-1000, a product by ARCO Chemical Co., U.S.A.) were added to the aqueous alkaline solution and the mixture was agitated at 90° C. After 2 hours of continued agitation at the same temperature, the reaction mixture became clear and the reaction was terminated by discontinuing agitation and heating.

The thus obtained reaction mixture was a light yellow, viscous solution having a pH of 7.22 and containing 37% by weight of the saponified product of copolymer of styrene and maleic acid. This aqueous solution is referred to as the component ($Z_1$) hereinbelow.

Preparation 2 (Preparation of a saponified product of half-ester copolymer of styrene and maleic acid)

Into a glass reaction vessel of 50 liter capacity were introduced 10 kg of methyl ethyl ketone and 2 kg of the same copolymer of styrene and maleic acid as used in Preparation 1 and the mixture was agitated under reflux to dissolve the copolymer in the solvent. Thereafter, 0.51 kg of n-propyl alcohol was added dropwise to the copolymer solution and the reaction was continued for 10 hours followed by stripping of methyl ethyl ketone by distillation under reduced pressure to give a half-propyl ester of the copolymer of styrene and maleic acid. This product had an acid value of 230 mg KOH/g.

Separately, an aqueous alkaline solution was prepared by introducing 4.33 kg of water and 0.33 kg of sodium hydroxide into a glass reaction vessel of 100 liter capacity. Then, 2 kg of the pulverized half ester product obtained above were added to the aqueous alkaline solution and the mixture was agitated at 90° C. After 2 hours of continued agitation at the same temperature, the reaction mixture became clear and the reaction was terminated by discontinuing agitation and heating.

The thus obtained reaction mixture was a light yellow, viscous solution having a pH of 8.0 and containing 33.8% by weight of the saponification product of the propyl half ester of the copolymer of styrene and maleic acid. This aqueous solution is referred to as the component ($Z_2$) hereinbelow.

Preparation 3 (Preparation of a saponified product of half-ester of a copolymer of styrene and maleic acid)

An aqueous alkaline solution was prepared by introducing 0.5 kg of sodium hydroxide and 8.4 kg of water into a glass reaction vessel of 100 liter capacity with agitation. Then, 4.0 kg of a half butyl cellosolve ester of a copolymer of styrene and maleic acid in a styrene/maleic anhydride copolymerization ratio of 1:1 by moles having a number-average molecular weight of 2500 and an acid value of 175 mg KOH/g (SMA-1440, a product by ARCO Chemical Co., U.S.A) were added to the aqueous alkaline solution and the mixture was agitated at 90° C. After 2 hours of continued agitation at the same temperature, the reaction mixture became clear and the reaction was terminated by discontinuing agitation and heating.

The thus obtained reaction mixture was a light yellow, viscous solution having a pH of 9.32 and containing 31.6% by weight of the saponified product of half butyl cellosolve ester of the copolymer of styrene and maleic acid. This aqueous solution is referred to as the component ($Z_3$) hereinbelow.

Preparation 4 (Preparation of a sodium salt of a condensation product of naphthalene sulfonic acid with formaldehyde)

Sulfonation of naphthalene was performed by heating a mixture of 500 g of naphthalene and 600 g of 98% sulfuric acid at 160° C. for 1.5 hours. This reaction mixture was kept at 100° C. and 310 g of 37% formalin were added dropwise into the mixture to perform the condensation reaction of the naphthalene sulfonic acid and formaldehyde at the same temperature for 5 hours.

The thus obtained condensation product was processed by the conventional procedure of liming sodation to give a sodium salt of the condensation product of naphthalene sulfonic acid with formaldehyde. This product is referred to as the component (A) hereinbelow.

Preparation 5 (Preparation of a sodium salt of a condensation product of methylnaphthalene sulfonic acid with formaldehyde)

Sulfonation reaction of 2-methylnaphthalene was performed by heating a mixture of 500 g of 2-methylnaphthalene and 600 g of 98% sulfuric acid at 160° C. for 1.5 hours. This reaction mixture was kept at 100° C. and 310 g of 37% formalin were added dropwise into the reaction mixture to perform the condensation reaction of the 2-methylnaphthalene sulfonic acid and formaldehyde at the same temperature for 5 hours.

The thus obtained condensation product was processed by the conventional procedure of liming sodation to give a sodium salt of the condensation product of methylnaphthalene sulfonic acid with formaldehyde. This product is referred to as the component (B) hereinbelow.

Preparation 6 (Preparation of a sodium salt of a condensation product of naphthalene sulfonic acid and methylnaphthalene sulfonic acid with formaldehyde)

Sulfonation reaction was performed by adding 600 g of 98% sulfuric acid to a mixture of 100 g of 2-methylnaphthalene and 400 g of naphthalene and heating the mixture at 160° C. for 1.5 hours. Then, 310 g of 37% formalin were added dropwise to the reaction mixture kept at 100° C. and the condensation reaction was performed at the same temperature for 5 hours. In this case, the viscosity of the reaction mixture gradually increased as the reaction proceeded so that the viscosity of the mixture was decreased by the addition of a small volume of water to facilitate agitation of the mixture.

The thus obtained co-condensation product was processed by the conventional procedure of liming sodation to give a sodium salt of the co-condensation product of naphthalene sulfonic acid and methylnaphthalene sulfonic acid with formaldehyde. This product is referred to as the component (C) hereinbelow.

Preparation 7 (Preparation of a sodium salt of a condensation product of naphthalene sulfonic acid and lignin sulfonic acid)

Condensation reaction was performed by adding 98% sulfuric acid to a mixture of 100 g of naphthalene sulfonic acid and 300 g of lignin sulfonic acid and then adding 300 g of 37% formalin dropwise to the reaction mixture kept at 100° C. followed by keeping the reaction mixture at the same temperature for 5 hours. During this period, the viscosity of the reaction mixture gradually increased as the reaction proceeded so that the viscosity of the mixture was decreased by the addition of a small volume of water to facilitate agitation.

The thus obtained co-condensation product was processed by the conventional procedure of liming sodation to give a sodium salt of the co-condensation product of naphthalene sulfonic acid and lignin sulfonic acid with formaldehyde. This product is referred to as the component (D) hereinbelow.

Preparation 8 (Preparation of a sodium salt of lignin sulfonic acid)

An alkalified waste liquor from sulfite pulp process was oxidized by hydrogen peroxide and purified by ultrafiltration for fractionating molecular weight of 1000 to give lignin sulfonic acid. The thus obtained lignin sulfonic acid was converted to a sodium salt of lignin sulfonic acid by subjecting to the conventional procedure of liming sodation. This product is referred to as the component (E) hereinbelow.

Preparation 9 (Preparation of a sulfonated condensation product of melamine with formaldehyde)

Into a glass reaction vessel were introduced 76 g of a 37% formalin adjusted to a pH of 8 with sodium carbonate and 29 g of melamine and the mixture was heated at 70° C. After 5 minutes, the melamine was completely dissolved in the formalin and the reaction mixture became clear. Thereupon, the reaction mixture was immediately cooled and the mixture kept at 45° C. was admixed with 48 g of water and 25 g of sodium sulfite. Thereafter, the reaction mixture was heated again to a temperature of 80° C. where the reaction was performed for 20 hours to give a sulfonated condensation product of melamine with formaldehyde. This product is referred to as the component (F) hereinbelow.

Preparation 10 (Preparation of a saponified product of a sulfonated copolymer of styrene and maleic acid)

A copolymer of styrene and maleic acid was prepared by the copolymerization of 104 g of styrene and 98 g of maleic anhydride at 175° C. in the presence of benzoyl peroxide as the polymerization initiator. This copolymer was sulfonated by heating a mixture of 100 g of the copolymer and 200 g of 98% sulfuric acid for 2 hours at 100° C. and the reaction mixture was diluted by adding 500 g of water followed by liming sodation at 60° C. to give a sodium salt of the sulfonated copolymer. This product is referred to as the component (G) hereinbelow.

Preparation 11 (Preparation of a sodium salt of a condensation product of sulfonated creosote oil with formaldehyde)

Sulfonated creosote oil was prepared by heating a mixture of 500 g of creosote oil and 600 g of 98% sulfuric acid at 150° C. and then subjected to the condensation reaction with formaldehyde by adding dropwise 310 g of 37% formalin and heating the mixture at 100° C. for 5 hours.

The thus obtained condensation product was processed by the conventional procedure of liming sodation to give a sodium salt of a condensation product of the sulfonated creosote oil with formaldehyde. This product is referred to as the component (H) hereinbelow.

Preparation 12 (Preparation of a sodium salt of a condensation product of a sulfonated heavy aromatic hydrocarbon oil with formaldehyde)

A heavy aromatic hydrocarbon oil was sulfonated by heating a mixture of 500 g of the oil and 600 g of 98% sulfuric acid at 150° C. for 2 hours and then subjected to a condensation reaction with formaldehyde by adding dropwise 310 g of 37% formalin and heating the mixture at 100° C. for 5 hours.

The thus obtained condensation product was processed by the conventional procedure of liming sodation to give a sodium salt of a condensation product of the sulfonated heavy aromatic oil with formaldehyde. This product is referred to as the component (I) hereinbelow.

EXAMPLES 1 TO 27 AND COMPARATIVE EXAMPLES 1 TO 20

Concrete mixtures were prepared each by blending cement, sand, gravel and water taken in specified amounts for 1 minute in a compulsory mixing machine and then by adding the additives indicated in Table 1 followed by further blending for 30 seconds. The components (A) to (I) and (Z) were added to the concrete mixture each in the form of an aqueous solution of a concentration of 20 to 40% by weight.

Characterization of these concrete mixtures was performed by the measurements of the volume of entrained air and the slump value of the uncured mixture and the compression strength of the cured concrete blocks to give the results shown in Table 1 and Table 2.

TABLE 1

| Concrete Composition | Example | | | | | | | | |
|---|---|---|---|---|---|---|---|---|---|
| | 1 | 2 | 3 | 4 | 5 | 6 | 7 | 8 | 9 |
| Concrete | | | | | | | | | |
| Cement[1] (kilogram) | 324 | 324 | 324 | 324 | 324 | 324 | 324 | 324 | 324 |
| Fine Aggregate[2] (Sand) (kilogram) | 763 | 763 | 763 | 763 | 763 | 763 | 763 | 763 | 763 |
| Coarse Aggregate[3] (Small Stone) (kilogram) | 1070 | 1070 | 1070 | 1070 | 1070 | 1070 | 1070 | 1070 | 1070 |
| Water (kilogram) | 178 | 178 | 178 | 178 | 178 | 178 | 178 | 178 | 178 |
| Additive[4] (% by weight) | | | | | | | | | |
| Agent for air-entraining and water-reducing[5] | 0.25 | 0.25 | 0.25 | 0.25 | 0.25 | 0.25 | 0.25 | 0.25 | 0.25 |
| Component $Z_1$ | 0.1 | 0.1 | 0.1 | 0.1 | 0.1 | 0.1 | 0.1 | 0.1 | 0.1 |
| Component A | 0.1 | — | — | — | — | — | — | — | — |
| Component B | — | 0.1 | — | — | — | — | — | — | — |
| Component C | — | — | 0.1 | — | — | — | — | — | — |
| Component D | — | — | — | 0.1 | — | — | — | — | — |
| Component E | — | — | — | — | 0.1 | — | — | — | — |
| Component F | — | — | — | — | — | 0.1 | — | — | — |
| Component G | — | — | — | — | — | — | 0.1 | — | — |
| Component H | — | — | — | — | — | — | — | 0.1 | — |

TABLE 1-continued

| | | | | | | | | | |
|---|---|---|---|---|---|---|---|---|---|
| Component I | — | — | — | — | — | — | — | — | 0.1 |
| Evaluation | | | | | | | | | |
| Air content (%)[*6] | 5.1 | 5.0 | 5.0 | 5.6 | 5.5 | 5.1 | 5.1 | 4.8 | 5.0 |
| Slump Value[*7] (centimeter) | | | | | | | | | |
| Just after production | 19.5 | 19.5 | 19.5 | 19.5 | 19.0 | 19.0 | 19.5 | 18.5 | 18.5 |
| After 30 minutes | 18.5 | 19.0 | 18.0 | 18.0 | 15.0 | 17.5 | 18.5 | 16.5 | 16.0 |
| After 60 minutes | 16.5 | 16.5 | 17.0 | 18.0 | 13.0 | 14.0 | 16.0 | 12.5 | 12.5 |
| After 90 minutes | 15.0 | 14.0 | 14.0 | 15.0 | 10.0 | 12.0 | 16.0 | 11.5 | 10.0 |
| Compressive Strength[*8] (kilogram per square centimeter) | | | | | | | | | |
| After 7 days | 155 | 150 | 148 | 151 | 149 | 148 | 151 | 158 | 151 |
| After 28 days | 250 | 248 | 247 | 242 | 241 | 236 | 245 | 242 | 243 |

| | Comparative Example | | | | | | | | | |
|---|---|---|---|---|---|---|---|---|---|---|
| Concrete Composition | 1 | 2 | 3 | 4 | 5 | 6 | 7 | 8 | 9 | 10 |
| Concrete | | | | | | | | | | |
| Cement[*1] (kilogram) | 324 | 324 | 324 | 324 | 324 | 324 | 324 | 324 | 324 | 324 |
| Fine Aggregate[*2] (Sand kilogram) | 763 | 763 | 763 | 763 | 763 | 763 | 763 | 763 | 763 | 763 |
| Coarse Aggregate[*3] (Small Stone) (kilogram) | 1070 | 1070 | 1070 | 1070 | 1070 | 1070 | 1070 | 1070 | 1070 | 1070 |
| Water (kilogram) | 178 | 178 | 178 | 178 | 178 | 178 | 178 | 178 | 178 | 178 |
| Additive[*4] (% by weight) | | | | | | | | | | |
| Agent for air-entraining and water-reducing[*5] | 0.25 | 0.25 | 0.25 | 0.25 | 0.25 | 0.25 | 0.25 | 0.25 | 0.25 | 0.25 |
| Component $Z_1$ | — | — | — | — | — | — | — | — | — | — |
| Component A | 0.2 | — | — | — | — | — | — | — | — | — |
| Component B | — | 0.2 | — | — | — | — | — | — | — | — |
| Component C | — | — | 0.2 | — | — | — | — | — | — | — |
| Component D | — | — | — | 0.2 | — | — | — | — | — | — |
| Component E | — | — | — | — | 0.2 | — | — | — | — | — |
| Component F | — | — | — | — | — | 0.2 | — | — | — | — |
| Component G | — | — | — | — | — | — | 0.2 | — | — | — |
| Component H | — | — | — | — | — | — | — | 0.2 | — | — |
| Component I | — | — | — | — | — | — | — | — | 0.2 | — |
| Evaluation | | | | | | | | | | |
| Air Content[*6] (%) | 3.7 | 5.1 | 3.9 | 5.1 | 5.1 | 3.5 | 5.1 | 4.1 | 3.9 | 4.1 |
| Slump Value[*7] (centimeter) | | | | | | | | | | |
| Just after production | 18.5 | 18.5 | 18.5 | 19.0 | 18.5 | 18.5 | 19.5 | 18.0 | 18.0 | 8.0 |
| After 30 minutes | 13.5 | 13.0 | 13.0 | 16.0 | 13.0 | 12.0 | 18.0 | 14.0 | 13.5 | 5.0 |
| After 60 minutes | 8.5 | 9.0 | 9.0 | 14.0 | 9.0 | 9.0 | 14.5 | 9.5 | 9.5 | — |
| After 90 minutes | 5.5 | 6.0 | 6.0 | 10.0 | 6.0 | 6.0 | 14.0 | 6.5 | 6.0 | — |
| Compressive Strength[*8] (kilogram per square centimeter) | | | | | | | | | | |
| After 7 days | 150 | 146 | 148 | 146 | 146 | 144 | 149 | 148 | 145 | 145 |
| After 28 days | 240 | 242 | 240 | 233 | 232 | 228 | 239 | 229 | 231 | 230 |

Note
[*1] General purpose grade portland cement, a product by Tokuyama Soda Co.
[*2] Specific gravity 2.52 in saturated surface-dry condition, fineness modulus 2.34, occurring in Nagahama, Ohmishima, Japan
[*3] Crushed stone, specific gravity 2.70 in saturated surface-dry condition, fineness modulus 6.48, maximum size 20 mm, occurring in Suoh-Hanaoka
[*4] % by weight as solid based on the weight of the cement
[*5] Sodium lignin sulfonate (Pozolis No. 70, a product by Pozolis Bussan Co.)
[*6] According to JIS A 1128
[*7] According to JIS A 1101
[*8] According to JIS A 1108

TABLE 2

| | Example | | | | | | | | | |
|---|---|---|---|---|---|---|---|---|---|---|
| Concrete Composition | 10 | 11 | 12 | 13 | 14 | 15 | 16 | 17 | 18 | 19 |
| Concrete | | | | | | | | | | |
| Cement[*1] (kilogram) | 324 | 324 | 324 | 324 | 324 | 324 | 324 | 324 | 324 | 324 |
| Fine Aggregate[*2] (Sand) (kilogram) | 763 | 763 | 763 | 763 | 763 | 763 | 763 | 763 | 763 | 763 |
| Coarse Aggregate[*3] (Small Stone) (kilogram) | 1070 | 1070 | 1070 | 1070 | 1070 | 1070 | 1070 | 1070 | 1070 | 1070 |
| Water (kilogram) | 178 | 178 | 178 | 178 | 178 | 178 | 178 | 178 | 178 | 178 |
| Additive[*4] (% by weight) | | | | | | | | | | |
| Agent for air-entraining and water-reducing[*5] | 0.25 | 0.25 | 0.25 | 0.25 | 0.25 | 0.25 | 0.25 | 0.25 | 0.25 | 0.25 |
| Component $Z_2$ | 0.08 | 0.08 | 0.08 | 0.08 | 0.08 | 0.08 | 0.08 | 0.08 | 0.08 | — |
| Component $Z_3$ | — | — | — | — | — | — | — | — | — | 0.06 |
| Component A | 0.12 | — | — | — | — | — | — | — | — | 0.14 |
| Component B | — | 0.12 | — | — | — | — | — | — | — | — |
| Component C | — | — | 0.12 | — | — | — | — | — | — | — |
| Component D | — | — | — | 0.12 | — | — | — | — | — | — |
| Component E | — | — | — | — | 0.12 | — | — | — | — | — |
| Component F | — | — | — | — | — | 0.12 | — | — | — | — |
| Component G | — | — | — | — | — | — | 0.12 | — | — | — |

TABLE 2-continued

| | | | | | | | | | | |
|---|---|---|---|---|---|---|---|---|---|---|
| Component H | — | — | — | — | — | — | — | 0.12 | — | — |
| Component I | — | — | — | — | — | — | — | — | 0.12 | — |
| Evaluation | | | | | | | | | | |
| Air Content[*6] (%) | 5.0 | 4.9 | 4.9 | 5.4 | 5.2 | 4.9 | 4.9 | 4.7 | 4.9 | 5.0 |
| Slump Value[*7] (centimeter) | | | | | | | | | | |
| Just after production | 19.0 | 19.0 | 19.0 | 19.5 | 19.0 | 18.5 | 19.5 | 18.5 | 18.5 | 19.0 |
| After 30 minutes | 18.5 | 18.0 | 17.0 | 18.0 | 14.0 | 17.5 | 18.5 | 16.0 | 16.0 | 18.0 |
| After 60 minutes | 16.0 | 16.0 | 16.0 | 17.0 | 11.0 | 14.0 | 15.5 | 13.0 | 12.5 | 16.0 |
| After 90 minutes | 14.0 | 13.0 | 13.5 | 15.0 | 9.0 | 11.0 | 15.0 | 12.0 | 9.0 | 14.0 |
| Compressive Strength[*8] (kilogram per square centimeter) | | | | | | | | | | |
| After 7 days | 150 | 152 | 149 | 148 | 143 | 140 | 150 | 150 | 148 | 153 |
| After 28 days | 247 | 247 | 250 | 240 | 236 | 230 | 245 | 241 | 240 | 248 |

| | Example | | | | | | | |
|---|---|---|---|---|---|---|---|---|
| Concrete Composition | 20 | 21 | 22 | 23 | 24 | 25 | 26 | 27 |
| Concrete | | | | | | | | |
| Cement[*1] (kilogram) | 324 | 324 | 324 | 324 | 324 | 324 | 324 | 324 |
| Fine Aggregate[*2] (Sand) (kilogram) | 763 | 763 | 763 | 763 | 763 | 763 | 763 | 763 |
| Coarse Aggregate[*3] (Small Stone) (kilogram) | 1070 | 1070 | 1070 | 1070 | 1070 | 1070 | 1070 | 1070 |
| Water (kilogram) | 178 | 178 | 178 | 178 | 178 | 178 | 178 | 178 |
| Additive[*4] (% by weight) | | | | | | | | |
| Agent for air-entraining and water-reducing[*5] | 0.25 | 0.25 | 0.25 | 0.25 | 0.25 | 0.25 | 0.25 | 0.25 |
| Component $Z_2$ | — | — | — | — | — | — | — | — |
| Component $Z_3$ | 0.06 | 0.06 | 0.06 | 0.06 | 0.06 | 0.06 | 0.06 | 0.06 |
| Component A | — | — | — | — | — | — | — | — |
| Component B | 0.14 | — | — | — | — | — | — | — |
| Component C | — | 0.14 | — | — | — | — | — | — |
| Component D | — | — | 0.14 | — | — | — | — | — |
| Component E | — | — | — | 0.14 | — | — | — | — |
| Component F | — | — | — | — | 0.14 | — | — | — |
| Component G | — | — | — | — | — | 0.14 | — | — |
| Component H | — | — | — | — | — | — | 0.14 | — |
| Component I | — | — | — | — | — | — | — | 0.14 |
| Evaluation | | | | | | | | |
| Air Content[*6] (%) | 5.0 | 5.0 | 5.5 | 5.3 | 5.0 | 5.0 | 4.8 | 5.0 |
| Slump Value[*7] (centimeter) | | | | | | | | |
| Just after production | 19.0 | 19.5 | 19.5 | 19.0 | 18.5 | 18.5 | 17.5 | 18.5 |
| After 30 minutes | 17.5 | 18.0 | 18.0 | 16.0 | 16.5 | 17.5 | 15.5 | 16.0 |
| After 60 minutes | 16.0 | 16.5 | 17.0 | 14.0 | 13.0 | 15.0 | 12.5 | 12.5 |
| After 90 minutes | 14.5 | 13.5 | 16.0 | 11.0 | 11.0 | 15.0 | 11.5 | 10.0 |
| Compressive Strength[*8] (kilogram per square centimeter) | | | | | | | | |
| After 7 days | 150 | 146 | 148 | 143 | 143 | 145 | 150 | 150 |
| After 28 days | 246 | 245 | 242 | 238 | 230 | 240 | 238 | 240 |

| | Comparative Example | | | | | | | | | |
|---|---|---|---|---|---|---|---|---|---|---|
| Concrete Composition | 11 | 12 | 13 | 14 | 15 | 16 | 17 | 18 | 19 | 20 |
| Concrete | | | | | | | | | | |
| Cement[*1] (kilogram) | 324 | 324 | 324 | 324 | 324 | 324 | 324 | 324 | 324 | 324 |
| Fine Aggregate[*2] (Sand) (kilogram) | 763 | 763 | 763 | 763 | 763 | 763 | 763 | 763 | 763 | 763 |
| Coarse Aggregate[*3] (Small Stone) (kilogram) | 1070 | 1070 | 1070 | 1070 | 1070 | 1070 | 1070 | 1070 | 1070 | 1070 |
| Water (kilogram) | 178 | 178 | 178 | 178 | 178 | 178 | 178 | 178 | 178 | 178 |
| Additive[*4] (% by weight) | | | | | | | | | | |
| Agent for air-entraining and water-reducing | 0.25 | 0.25 | 0.25 | 0.25 | 0.25 | 0.25 | 0.25 | 0.25 | 0.25 | 0.25 |
| Component $Z_2$ | — | — | — | — | — | — | — | — | — | — |
| Component $Z_3$ | — | — | — | — | — | — | — | — | — | — |
| Component A | 0.2 | — | — | — | — | — | — | — | — | — |
| Component B | — | 0.2 | — | — | — | — | — | — | — | — |
| Component C | — | — | 0.2 | — | — | — | — | — | — | — |
| Component D | — | — | — | 0.2 | — | — | — | — | — | — |
| Component E | — | — | — | — | 0.2 | — | — | — | — | — |
| Component F | — | — | — | — | — | 0.2 | — | — | — | — |
| Component G | — | — | — | — | — | — | 0.2 | — | — | — |
| Component H | — | — | — | — | — | — | — | 0.2 | — | — |
| Component I | — | — | — | — | — | — | — | — | 0.2 | — |
| Evaluation | | | | | | | | | | |
| Air content[*6] (%) | 3.7 | 5.1 | 3.9 | 5.1 | 5.1 | 3.5 | 5.1 | 4.1 | 3.9 | 4.1 |
| Slump Value[*7] (centimeter) | | | | | | | | | | |
| Just after production | 18.5 | 18.5 | 18.5 | 19.0 | 18.5 | 18.5 | 19.5 | 18.0 | 18.0 | 8.0 |
| After 30 minutes | 13.5 | 13.0 | 13.0 | 16.0 | 13.0 | 12.0 | 17.0 | 14.0 | 13.5 | 5.0 |
| After 60 minutes | 8.5 | 9.0 | 9.0 | 14.0 | 9.0 | 9.0 | 12.0 | 9.5 | 9.5 | — |
| After 90 minutes | 5.5 | 6.0 | 6.0 | 10.0 | 6.0 | 6.0 | 11.0 | 6.5 | 6.0 | — |

TABLE 2-continued

| Compressive Strength*8 (kilogram per square centimeter) | | | | | | | | | | |
|---|---|---|---|---|---|---|---|---|---|---|
| After 7 days | 150 | 146 | 148 | 146 | 146 | 144 | 149 | 148 | 145 | 145 |
| After 28 days | 240 | 242 | 240 | 233 | 232 | 228 | 239 | 229 | 231 | 230 |

Note
*1General purpose grade portland cement, a product by Tokuyama Soda Co.
*2Specific gravity 2.52 in saturated surface-dry condition, fineness modulus 2.34, occurring in Nagahama, Ohmishima, Japan
*3Crushed stone, specific gravity 2.70 in saturated surface-dry condition, fineness modulus 6.48, maximum size 20 mm, occurring in Suoh-Hanaoka
*4% by weight as solid based on the weight of the cement
*5Sodium lignin sulfonate (Pozolis No. 70, a product by Pozolis Bussan Co.)
*6According to JIS A 1128
*7According to JIS A 1101
*8According to JIS A 1108

ADDENDUM EXAMPLES 1 to 3

Concrete mixtures were prepared each by blending cement, sand, gravel and water taken in specified amounts for 1 minute in a compulsory mixing machine (capacity: 100 liter) and then by adding the additives indicated in Table 3 followed by further blending for 30 seconds. The components ($Z_1$), ($Z'$) and (A) were added to the concrete mixture in the form of an aqueous solution of a concentration of 20 to 40% by weight.

Characterization of these concrete mixtures was performed by the measurements of the volume of entrained air and the slump value of the uncured mixture and the compression strength of the cured concrete blocks to give the results shown in Table 3 which also includes the data obtained in Example 1.

The component ($Z'$) was a saponified product of a sulfonated copolymer of styrene and maleic acid prepared by the method described below.

A styrene-maleic acid copolymer ("SMA-3000" manufactured by ARCO Chemical Co.; number average molecular weight: 1,900) (85 grams) was dissolved in 100 milliliters of 98 percent concentrated sulfuric acid and 80 grams of fuming sulfuric acid was added thereto over one hour while adjusting the temperature to 30 to 40° C. Then the mixture was allowed to react for 3 hours to achieve sulfonation of the copolymer.

After the reaction was completed, water was added to the reaction mixture, and the unreacted styrene-maleic acid copolymer was removed by filtration. Then the remaining sulfuric acid was removed as gypsum by performing the usual liming sodation method at 70° C., whereupon there was obtained 138 grams of the saponified product (sodium salt). The yield was 85 percents.

TABLE 3

| Concrete Composition | Example 1 | Addendum Example 1 | Addendum Example 2 | Addendum Example 3 |
|---|---|---|---|---|
| Concrete | | | | |
| Cement*1 (kilogram) | 324 | 324 | 324 | 324 |
| Fine Aggregate*2 (Sand) (kilogram) | 763 | 763 | 763 | 763 |
| Coarse Aggregate*3 (Small Stone) (kilogram) | 1070 | 1070 | 1070 | 1070 |
| Water (kilogram) | 178 | 178 | 178 | 178 |
| Additive*4 (% by weight) | | | | |
| Air taking-Water reducing agent*5 | 0.25 | 0.25 | 0.25 | 0.25 |
| Component $Z_1$ | 0.1 | 0.2 | — | — |
| Component $Z'$*9 | — | — | 0.2 | 0.1 |
| Component A | 0.1 | — | — | 0.1 |
| Evaluation | | | | |
| Air Content*6 (%) | 5.1 | >10 | 4.1 | 4.4 |
| Slump Value*7 (centimeter) | | | | |
| Just after production | 19.5 | 20.5 | 19.0 | 20.5 |
| After 30 minutes | 18.5 | 19.5 | 16.0 | 16.5 |
| After 60 minutes | 16.5 | 18.0 | 12.5 | 13.0 |
| After 90 minutes | 15.0 | 16.0 | 10.5 | 11.0 |
| Compression Strength*8 (kilogram per square centimeter) | | | | |
| After 7 days | 155 | 102 | 158 | 149 |
| After 28 days | 250 | 211 | 260 | 255 |

Note
*1General purpose grade portland cement, a product by Tokuyama Soda Co.
*2Specific gravity 2.52 in saturated surface-dry condition, fineness modulus 2.34, occurring in Nagahama, Ohmishima, Japan
*3Crushed stone, specific gravity 2.70 in saturated surface-dry condition, fineness modulus 6.48, maximum size 20 mm, occurring in Suoh-Hanaoka
*4% by weight as solid based on the weight of the cement
*5Sodium lignin sulfonate (Pozolis No. 70, a product by Pozolis Bussan Co.)
*6According to JIS A 1128
*7According to JIS A 1101
*8According to JIS A 1108
*9Saponified product of sulfonated copolymer of styrene and maleic acid.

What is claimed is:

1. Cement additive composition for lastingly improving the flowability of a cement-based mixture which comprises:
   (a) 100 parts by weight of a saponified product of a copolymer of styrene and maleic acid of the formula

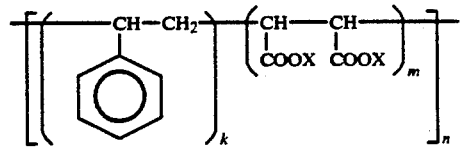

wherein X is sodium, potassium or calcium or an ammonium group, K is a positive integer of 1 to 5, m is a positive integer of 1 to 3 and n is a positive integer of 4 to 10, or a saponified product of a half ester of a copolymer of styrene and maleic anhydride of the formula

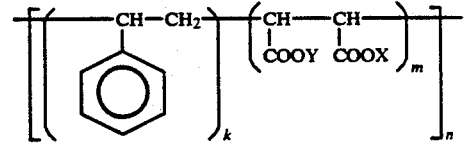

wherein Y is R or ROR', and R and R' are each an alkyl group or a cycloalkyl group; and
   (b) from 5 to 900 parts by weight of at least one flowability-improving agent selected from the group consisting of a salt of a condensation product of naphthalene sulfonic acid with formaldehyde, salt of a condensation product of an alkylnaphthalene sulfonic acid with formaldehyde, salt of a condensation product of naphthalene sulfonic acid and an alkylnaphthalene sulfonic acid with formaldehyde, salt of a condensation product of naphthalene sulfonic acid and lignin sulfonic acid with formaldehyde, salt of lignin sulfonic acid, sulfonated condensation product of melamine with formaldehyde, saponified product of a sulfonated copolymer of styrene and maleic acid, salt of a condensation product of a sulfonated creosote oil with formaldehyde and salt of a condensation product of a sulfonated heavy aromatic hydrocarbon oil with formaldehyde.

2. The cement additive composition as claimed in claim 1 wherein the component (a) is a saponified product of a copolymer of styrene and maleic acid having a number-average molecular weight in the range from 1000 to 9000 or a half ester of the said copolymer with a compound selected from the group consisting of sodium hydroxide, potassium hydroxide, calcium hydroxide and ammonium hydroxide.

3. The cement additive composition as claimed in claim 1 wherein the amount of the component (b) is in the range from 25 to 400 parts by weight per 100 parts by weight of the component (a).

4. The cement additive composition as claimed in claim 1 wherein the component (a) is a saponified product of a copolymer of sytrene and maleic acid having a number-averagic molecular weight in the range from 1000 to 9000 or a half ester of the said copolymer with a compound selected from the group consisting of sodium hydroxide, potassium hydroxide, calcium hydroxide and ammonium hydroxide.

5. The cement additive composition as claimed in claim 1 wherein the amount of the component (b) is in the range from 25 to 400 parts by weight per 100 parts by weight of the component (a).

6. The cement additive composition as claimed in claim 4 wherein the amount of the component (b) is in the range from 25 to 400 parts by weight per 100 parts by weight of the component (a).

7. The cement additive composition as claimed in claim 6 wherein said copolymer of styrene and maleic acid has a number-average molecular weight in the range from 1500 to 3000.

8. The cement additive composition as claimed in claim 7, wherein said flowability-improving agent is the sodium salt of the condensation product of naphthalene sulfonic acid with formaldehyde.

9. The cement additive composition as claimed in claim 7, wherein said flowability-improving agent is the sodium salt of the condensation product of methylnaphthalene sulfonic acid with formaldehyde.

10. The cement additive composition as claimed in claim 7, wherein said flowability-improving agent is the sodium salt of the co-condensation product of naphthalene sulfonic acid and methylnaphthalene sulfonic acid with formaldehyde.

11. The cement additive composition as claimed in claim 7, wherein said flowability-improving agent is the sodium salt of the co-condensation product of naphthalene sulfonic acid and lignin sulfonic acid with formaldehyde.

12. The cement additive composition as claimed in claim 7, wherein said flowability-improving agent is the sodium salt of the sulfonated copolymer of styrene and maleic acid.

13. The cement additive composition as claimed in claim 1, wherein said flowability-improving agent is the sodium salt of the condensation product of naphthalene sulfonic acid with formaldehyde.

14. The cement additive composition as claimed in claim 1, wherein said sodium salt of the condensation product of methylnaphthalene sulfonic acid with formaldehyde.

15. The cement additive composition as claimed in claim 1, wherein said flowability-improving agent is the sodium salt of the co-condensation product of naphthalene sulfonic acid and methylnaphthalene sulfonic acid with formaldehyde.

16. The cement additive composition as claimed in claim 1, wherein said flowability-improving agent is the sodium salt of the co-condensation product of naphthalene sulfonic acid and lignin sulfonic acid with formaldehyde.

17. The cement additive composition as claimed in claim 1, wherein said flowability-improving agent is the sodium salt of the sulfonated copolymer of styrene and maleic acid.

18. A cement mixture having improved flowability comprising cement and from 0.01–1.0% by weight of said cement of the cement additive composition as claimed in claim 1.

* * * * *